United States Patent Office 3,535,197
Patented Oct. 20, 1970

3,535,197
HIGH FREQUENCY ELECTRIC WELDED RETICULATED FOAM COMPOSITE
John Fishbein and Raymond W. H. Bell, Swansea, Wales, assignors to The Dunlop Company Limited, London, England, a British company
No Drawing. Filed Apr. 10, 1968, Ser. No. 720,351
Claims priority, application Great Britain, Apr. 21, 1967, 18,359/67
Int. Cl. B29c 27/04; B32b 3/26, 7/04
U.S. Cl. 161—160    6 Claims

ABSTRACT OF THE DISCLOSURE

Composite sheet material comprises a sheet of a thermoplastic plastics material and a plastics foam material of skeletal structure, for instance reticulated polyurethane foam, bonded together by high frequency electric welding. These products have a considerably higher bond strength between the layers than similar articles in which the foam material is not of skeletal structure.

---

This invention relates to composite articles and in particular to composite sheet material comprising a thermoplastic material and plastics foam material bonded together.

Various composite articles in sheet form have been produced by welding together, using high frequency (i.e. radio frequency) welding techniques, a sheet of a thermoplastic material and a sheet of synthetic plastics foam material. Although this technique has been proposed for welding together sheets of polyvinyl chloride (p.v.c.) and polyurethane foam, difficulty has been encountered in putting this into practice, especially in that it is difficult to obtain a welded product with a sufficiently strong bond between the p.v.c. and polyurethane foam.

We have now found, according to the present invention, that a surprisingly strong bond between p.v.c. (or other thermoplastic plastics materials) and the foam can be obtained by means of high frequency electric welding provided that the foam has a reticulated or other skeletal structure. Accordingly, the invention comprises composite sheet material obtained by bonding together by means of high frequency electric welding a sheet of thermoplastic plastics material and a plastics foam material of skeletal structure.

The skeletal foam is very coveniently a reticulated foam, especially where it is a polyurethane foam. Reticulated polyurethane foams can be obtained from normal polyurethane foam by treatment of polyester foam with alkali, such as is described in United Kingdom specification No. 858,127 (Scott Paper Company) or by subjecting polyether or polyester foam to a thermal method such as that described in United Kingdom specification No. 1,063,462 (Chemotronics Corporation Inc.).

Other skeletal or reticular foams are those obtained as such without a reticulation step. Examples of such foams are those obtained from castor oil and a polyisocyanate using a cell-opening agent, for instance toluene; and those obtained from polyethers such as Polydiol 600 and Polywax 1550 (supplied by Chemische Werke Hüls).

The thermoplastic material can be, for example, p.v.c. a polyamide, polyethylene, acrylonitrile-butadiene-styrene copolymer or an ethylene-vinyl acetate copolymer. Thus the composite sheet material of this invention can contain a sheet of any thermoplastic material which can be bonded to ordinary, that is non-skeletal, plastics foam by means of high frequency electric welding. However, as is familiar to those skilled in the art, where the thermoplastics material is one lacking polar grouping, such as polyolefins, which are not susceptible to direct dielectric heating, it is necessary for the heat to be supplied to the thermoplastic material indirectly, for instance by holding it in the electric field against a sheet of material which itself becomes hot under the influence of the field.

The composite sheet material of this invention is suitable for a wide variety of uses where conventional laminates of p.v.c. sheet and polyurethane foam are used for example, as car head and door linings and upholstery material. A preferred form of composite sheet material is that in which a sheet of reticulated polyurethane foam is sandwiched between two sheets of the p.v.c. or other thermoplastic material.

The invention is illustrated by the following examples.

EXAMPLE 1

A sheet of plasticised p.v.c. of 0.016 inch thickness was laid on top of a sheet of reticulated polyether polyurethane foam having a density of 1 pound/cubic foot (p.c.f.) one quarter inch thick, and the double layer was sandwiched between two sheets of silicone rubber barrier material. The reticulated foam has been obtained by the thermal reticulation method. The sandwich thus obtained was laid over a brass former, having an upstanding flange in the shape of a rectangle with which the lower layer of silicone rubber was in contact. The sandwich was then subjected to high frequency heating in a 4/WP high frequency press (sold by Radyne Limited) using a hydraulic pressure of 35 p.s.i. and a dwell time of 5 seconds. The power required was 0.6 kilowatt.

For the purpose of comparison this procedure was repeated except that non-reticulated foam (having a density of 1 pound/cubic foot) was used instead of reticulated foam.

It was found that the weld obtained was substantially better in the case of the reticulated foam, especially in so far as the resistance to separation along the weld was concerned.

The strength of bond between the p.v.c. and polyurethane foam was measured by taking a piece of the composite material one inch wide, that is having a one inch length of weld seam, and measuring its tensile strength (load to break) at right angles to the seam in a Hounsfield Tensile Strength Machine. The results obtained are given in Table I below.

EXAMPLE 2

Example 1 was repeated except that the foam (both reticulated and non-reticulated) had a density of 1.4 pounds/cubic foot. The tensile strength values are given in Table I.

EXAMPLE 3

Example 1 was repeated except that the foam (both reticulated and non-reticulated) had a density of 1.8 pounds/cubic foot. The tensile strength values are given in Table I.

TABLE I

| Example No. | Foam density (p.c.f.) | Tensile strength (lb.) | | Percentage increase obtained using reticulated foam |
| --- | --- | --- | --- | --- |
| | | Nonreticulated | Reticulated | |
| 1 | 1.0 | 1.5 | 2.8 | 86 |
| 2 | 1.4 | 2.5 | 3.4 | 36 |
| 3 | 1.8 | 1.8 | 2.5 | 39 |

EXAMPLES 4–7

The procedure of Example 1 was repeated using respectively instead of p.v.c., sheets of 0.5 mm. thick ethylene-vinyl acetate copolymer (Example 4), 0.3 mm. thick low density polyethylene (Example 5), 1 mm. thick rigid acrylonitrile-styrene-butadiene copolymer (Example 6) and 0.5 mm. thick Surlyn ionomer (Example 7). In each of Examples 4–7 the pressure was 40 p.s.i. and the dwell time 10 seconds. The results obtained are given in Table II below.

TABLE II

| Example No. | Foam density (p.c.f.) | Power required (kw.) | Tensile strength (lb.) | | Percentage increase obtained using reticulated foam |
|---|---|---|---|---|---|
| | | | Nonreticulated | Reticulated | |
| 4 | 1.4 | 2.1 | 1.5 | 4.4 | 193 |
| 5[1] | 1.0 | 1.7 | 1.6 | 2.9 | 91 |
| 6 | 1.9 | 1.5 | | 3.8 | |
| 7 | | | | 2.7 | |

[1] The thickness of the foam was 0.375 inch in this example.

EXAMPLE 8

A sheet of plasticised p.v.c. 0.015 inch thick was laid on top of a sheet of polyether polyurethane foam 0.125 inch thick which had been reticulated by the thermal method of British specification No. 1,063,462. The reticulated foam had a density of 1.5 pounds/cubic foot. The resulting double layer was sandwiched between two layers of silicone-treated nylon fabric. The sandwich thus obtained was placed between a flat brass plate and a brass former having a $\frac{1}{16}$-inch-wide raised strip. A load of 70 pounds was applied to the former, and the sandwich was subjected to high-frequency heating using power of 120 watts at 70 megacycles for 1.5 seconds.

For the purpose of comparison this procedure was repeated using foam that had not been reticulated and a power of 150 watts.

EXAMPLE 9

A 0.25 inch-thick sheet of the reticulated polyether urethane foam of Example 8 was placed between a 0.018 inch-thick and a 0.005 inch-thick sheet of plasticised p.v.c., and this triple layer was then placed between two sheets of silicone-treated nylon fabric. The five-layer assembly was placed in a high-frequency press and a welded line was produced as in Example 8 but using a power of 200 watts.

For the purpose of comparison this procedure was repeated using foam that had not been reticulated and power of 300 watts.

Examination of the cross-section of the composite sheet materials of Examples 8 and 9 showed that a much better weld had been obtained using the reticulated foam. The bond strengths of the composite sheet materials of the Examples 8 and 9 and the comparative materials were measured along the direction of the weld. The results are given in Table III below.

TABLE III

| Example No. | Tensile strength (kg./cm.) | | Percentage increase obtained using reticulated foam |
|---|---|---|---|
| | Nonreticulated | Reticulated | |
| 8 | 0.26 | 0.43 | 65 |
| 9 | [1] 0.20 | [1] 1.06 | 430 |
| | [2] 0.10 | [2] 0.75 | 650 |

[1] Bond strength between the foam and the 0.018 inch thick p.v.c. sheet
[2] Bond strength between the foam and the 0.005 inch thick p.v.c. sheet

Having now described our invention, what we claim is:

1. Composite sheet material comprising a sheet of thermoplastic plastics material and a plastics foam material of skeletal structure bonded together by means of high frequency electric welding.

2. Composite sheet material according to claim 1, in which the foam material is a reticulated polyurethane foam.

3. Composite sheet material according to claim 2, in which the reticulated foam has been obtained by thermal reticulation.

4. Composite sheet material according to claim 1, in which the thermoplastic material is polyvinyl chloride.

5. Composite sheet material according to claim 1, in which the thermoplastic material is an ethylene-vinyl acetate copolymer.

6. Composite sheet material according to claim 1, in which the thermoplastic material is an acrylonitrile-butadiene-styrene copolymer, polyamide or polyethylene.

References Cited

UNITED STATES PATENTS

| 3,026,233 | 3/1962 | Scholl et al. | 156—272 |
| 3,244,571 | 4/1966 | Weisman | 161—121 |
| 3,325,338 | 6/1967 | Green | 161—159 |
| 3,377,643 | 4/1968 | Teng et al. | 161—159 |

WILLIAM J. VAN BALEN, Primary Examiner

U.S. Cl. X.R.

156—272, 306; 161—161